United States Patent
Hunzinger

(10) Patent No.: US 7,010,319 B2
(45) Date of Patent: Mar. 7, 2006

(54) OPEN-LOOP POWER CONTROL ENHANCEMENT FOR BLIND RESCUE CHANNEL OPERATION

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 445 days.

(21) Appl. No.: 10/052,783

(22) Filed: Jan. 18, 2002

(65) Prior Publication Data

US 2002/0137535 A1 Sep. 26, 2002

Related U.S. Application Data

(60) Provisional application No. 60/262,689, filed on Jan. 19, 2001.

(51) Int. Cl.
*H04B 7/00* (2006.01)

(52) U.S. Cl. ..................... 455/522; 455/13.4
(58) Field of Classification Search ............... 455/522, 455/571, 572, 573, 574
See application file for complete search history.

(56) References Cited

U.S. PATENT DOCUMENTS

| | | | |
|---|---|---|---|
| 5,081,671 A | 1/1992 | Raith et al. | |
| 5,267,261 A | 11/1993 | Blakeney, II et al. | |
| 5,301,356 A | 4/1994 | Bodin et al. | |
| 5,353,332 A | 10/1994 | Raith et al. | |
| 5,530,912 A | 6/1996 | Agrawal et al. | |
| 5,640,414 A | 6/1997 | Blakeney, II et al. | |
| 5,673,259 A | 9/1997 | Quick, Jr. et al. | |
| 5,722,044 A | 2/1998 | Padovani et al. | |
| 5,729,826 A | 3/1998 | Gavrilovich | |
| 5,749,055 A | 5/1998 | Dahlin | |
| 5,781,856 A | 7/1998 | Jacobs et al. | |
| 5,884,174 A | 3/1999 | Nagarajan et al. | |
| 5,913,167 A | 6/1999 | Bonta et al. | |
| 5,937,019 A | 8/1999 | Padovani | |
| 6,052,594 A | 4/2000 | Chuang et al. | |
| 6,061,337 A | 5/2000 | Light et al. | |
| 6,104,927 A | 8/2000 | Willey | |
| 6,161,014 A | 12/2000 | Girardeau et al. | |
| 6,233,454 B1 | 5/2001 | Sato | |
| 6,236,365 B1 | 5/2001 | LeBlanc et al. | |
| 6,246,872 B1 | 6/2001 | Lee et al. | |
| 6,253,083 B1 | 6/2001 | Hacena et al. | |
| 6,337,983 B1 | 1/2002 | Bonta et al. | |
| 6,343,216 B1 | 1/2002 | Kim et al. | |
| 6,345,185 B1 | 2/2002 | Yoon et al. | |
| 6,360,100 B1 | 3/2002 | Grob et al. | |
| 6,445,918 B1 | 9/2002 | Hellander | |
| 6,512,927 B1 | 1/2003 | Hunzinger | |
| 6,519,457 B1 | 2/2003 | Jiang et al. | |
| 6,542,744 B1 | 4/2003 | Lin | |

(Continued)

*Primary Examiner*—Nay Maung
*Assistant Examiner*—Angelica M. Perez
(74) *Attorney, Agent, or Firm*—Morrison & Foerster, LLP

(57) ABSTRACT

A method and apparatus for determining an efficient and reliable power level for the MS's transmitter for reverse link communications during a rescue procedure to rescue dropped calls quickly and with a high success rate is disclosed. A mobile station's mean rescue transmission output power level is computed by first determining the mobile station's mean receive input power level when the mobile station transmits during a connection rescue procedure. This mean receive input power level is then adjusted using up to four parameters. These four variables include (1) a pre-rescue power delta, (2) a rescue interference delta, (3) a rescue delay compensation value, and (4) a pre-determined value.

36 Claims, 8 Drawing Sheets

U.S. PATENT DOCUMENTS

| | | |
|---|---|---|
| 6,567,666 B1 | 5/2003 | Czaja et al. |
| 6,580,919 B1 * | 6/2003 | Saito .......................... 455/522 |
| 6,606,343 B1 * | 8/2003 | Zeira et al. ................. 375/130 |
| 6,671,265 B1 | 12/2003 | Hwang et al. |
| 6,674,736 B1 | 1/2004 | Tiedemann, Jr. |
| 2001/0055969 A1 | 12/2001 | Bonta et al. |
| 2002/0034947 A1 | 3/2002 | Soliman |
| 2002/0037726 A1 | 3/2002 | Czaja et al. |
| 2002/0142776 A1 | 10/2002 | Tiedemann, Jr. |
| 2003/0002525 A1 | 1/2003 | Grilli |
| 2003/0022630 A1 * | 1/2003 | Gandhi et al. ................ 455/69 |
| 2004/0233883 A1 | 11/2004 | Ludwig et al. |

* cited by examiner

Forward Link
  Pilot Channel(s)
  Sync Channel
  Paging Channel(s)
  Traffic Channels Reverse Link
  Access Channel
  Traffic Channel(s)

(Forward-Based Rescue)

(Reverse-Based Rescue)

OPEN-LOOP POWER CONTROL ENHANCEMENT FOR BLIND RESCUE CHANNEL OPERATION

CROSS-REFERENCE TO RELATED APPLICATIONS

Embodiments of the present invention claim priority from U.S. provisional patent application Ser. No. 60/262,689 entitled "Open-Loop Power Control Enhancement for Blind Rescue Channel Operation," filed Jan. 19, 2001, and are related to U.S. utility application Ser. No. 09/978,974 entitled "Forward Link Based Rescue Channel Method and Apparatus for Telecommunication Systems," filed Oct. 16, 2001, the contents of which are incorporated herein by reference for all purposes.

BACKGROUND OF THE INVENTION

1. Field of the Invention

The present invention relates, generally, to communication network management and, in one embodiment, to a method and apparatus for utilizing open-loop power control to control the transmit power of a mobile station transmitter during a connection rescue procedure.

2. Description of Related Art

INTRODUCTION

Rather than just providing a means for emergency communications, cellular telephones are rapidly becoming a primary form of communication in today's society. As cellular telephone usage becomes widespread, cellular telephone networks are becoming increasingly prevalent and are providing coverage over larger areas to meet consumer demand. FIG. 1 depicts an example of a mobile station (MS) 10 operated by a mobile user that roves through a geographic area served by a wireless infrastructure or network including a first base station (BS) 12 with wireless sectors A 14 and sector B 16, and a second BS 18, with a sector C 20. In the course of such roving, MS 10 travels from position A to position B to position C and will, as a matter of course, experience variations in signal strength and signal quality of the communication link associated with the BS(s) that it is in contact with. Signal strength and quality can be especially undependable near the edges of the sectors, such as when the MS 10 transitions from the area defined by the dotted line of Sector A 14 to the area defined by the dotted line of Sector B 16, or from Sector B 16 to Sector C 20. It is in these transition areas, as well as other areas of weak signal strength or quality, where dropped connections are likely to occur. A connection as referred to herein includes, but is not limited to, voice, multimedia video or audio streaming, packet switched data and circuit switched data connections, short message sequences or data bursts, and paging.

Dropped connections can range from being a nuisance to devastating for cellular telephone users. For example, a dropped emergency 911 connection can be critical or even fatal. Dropped connections can create consumer frustration significant enough to cause the consumer to change service providers. Thus, the prevention of dropped connections is of major importance to cellular network providers.

Cellular Telephone Networks

FIG. 2 illustrates an exemplary communication link 22 between a MS 24 and a BS 26. Communications from the BS 26 to the MS 24 are called the forward link, and communications from the MS 24 to the BS 26 are called the reverse link. A BS 26 is typically comprised of multiple sectors, usually three. Each sector includes a separate transmitter and antenna (transceiver) pointed in a different direction. Because a cell site can be omni or sectorized, it should be understood that the terms BS and sector are used herein somewhat interchangeably. The forward and reverse links utilize a number of forward and reverse channels. For example, the BS 26 communicates with the MSs using a plurality of forward common channels or links which may include, but are not limited to, one or more pilot channels, a sync channel, and one or more paging channels, discussed in greater detail below. These channels are referred to as common channels because the BS 26 may communicate those channels to all MSs in the network. Generally, these common channels are not used to carry data, but are used to broadcast and deliver common information.

Each sector within BS 26 broadcasts a pilot channel that identifies that sector and is simple for a MS 24 to decode. Both sectors and pilot channels are distinguished by pseudo-noise (PN) offsets. The word "pilot" can be used almost interchangeably with the term sector, because a pilot channel identifies a sector. The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS. When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message. In general, each BS may utilize one pilot channel, one sync channel and one paging channel that are common for all MSs to receive. However, because there are practical limitations on the number of MSs that can be simultaneously paged using one paging channel, some BSs may employ multiple paging channels.

In addition to the forward common channels described above, the BS 26 communicates with individual MSs using a plurality of forward dedicated channels or links which may include, but are not limited to, multiple traffic channels, multiple supplemental channels, and multiple access channels and control channels. These channels are referred to as dedicated channels because the BS communicates the channels to a specific MS 24, and the channels may carry data.

The reverse channels or links may include an access channel and one or more reverse traffic channels and control channels. After a MS receives an incoming page from a BS, the MS will initiate a connection setup using, in part, an access channel.

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window.

Code division multiple access (CDMA) is a technique for spread-spectrum multiple-access digital communications that creates channels through the use of unique code sequences. It allows a number of MSs to communicate with one or more BSs in neighboring cell sites, simultaneously using the same frequency. In CDMA, given a space of frequency and time, each channel is assigned a particular orthogonal code such as a Walsh code or a quasi-orthogonal function (QOF). In direct sequence CDMA, the data from each channel is coded using Walsh codes or QOFs and then combined into a composite signal. This composite signal is spread over a wide frequency range at a particular time.

When this composite signal is de-spread using the same code used to spread the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary.

In CDMA systems, signals can be received in the presence of high levels of narrow-band or wide-band interference. The practical limit of signal reception depends on the channel conditions and interference level. Types of interference include those generated when the signal is propagated through a multi-path channel, signals transmitted to and from other users in the same or other cell sites, as well as self-interference or noise generated at the device or MS. However, noise and interference in the field may require error correction to determine what was actually transmitted.

The CDMA wireless communication system is fully described by the following standards, all of which are published by the TELECOMMUNICATIONS INDUSTRY ASSOCIATION, Standards & Technology Department, 2500 Wilson Blvd., Arlington, Va. 22201, and all of which are herein incorporated by reference: TIA/EIA-95A, published in 1993; TIA/EIA-95B, published Feb. 1, 1999; TIA/EIA/IS-2000, Volumes 1–5, Release A, published Mar. 1, 2000; TIA/EIA-98D, published Jun. 1, 2001; and WCDMA standards 3GPP TS 25.214 V4.2.0 published September 2001, TS25.401 V5.1.0 published September 2001, TS 25.331 V4.2.0 published Oct. 8, 2001, and TR 25.922 V4.1.0 published Oct. 2, 2001.

As described above with reference to an example CDMA system, orthogonal codes may be used to code a particular channel. For example, the simple-to-decode pilot channel described above may use a fixed, known code such as the all one coded $W_0$ Walsh code. Similarly, the sync channel may use the alternating polarity $W_{32}$ Walsh code. In addition to the orthogonal codes used to define channels such as traffic channels, for example, privacy scrambling may also be added such that a MS can only read the data on the traffic channel that it can unscramble. This privacy scrambling may be accomplished by the use of a mask in conjunction with the orthogonal code.

Each MS groups the BS sectors into various sets, which may include, but is not limited to, an active set, a neighbor set, a candidate set, and a remaining set, discussed in further detail below.

The MS active set contains the PN offset identifiers of pilots corresponding to the BS sectors that are communicating with the MS at any point in time. However, it should be noted that for purposes of simplifying the description herein, the MS active set may be identified as containing "pilots." Thus, when a MS is idle, but monitoring a single BS for pages and overhead updates, the active set for that MS will contain that BS pilot's PN offset identifier as its only member. There may be instances, however, when a MS is being handed off from one BS or sector to another, and during this handoff may actually be in communication with multiple BSs or sectors at the same time. When this occurs, multiple active pilots will be in the active set at the same time. For example, in a "soft handoff," a MS in communication with BS "A" will begin to communicate with a BS "B" without first dropping BS "A," and as a result both BS "A" and "B" will be in the active set. In a "softer handoff," a MS in communication with sector "A" in BS "A" will begin to communicate with a sector "B" in BS "A" without first dropping sector "A," and as a result both sector "A" and "B" will be in the active set. In a "hard hand-off," however, a MS in communication with BS "A" will begin to communicate with a BS "B" only after first dropping BS "A," and as a result either BS "A" or "B" will be in the active set at any one time, but not both.

During the time in which the MS is in communication with multiple BSs, the MS assigns rake receiver fingers to multiple channels from one or more sectors at the same time. When a MS is in communication with multiple BSs at the same time, the MS should be receiving the same data from both of those BSs. However, although the data may be the same, it may be communicated differently from different BSs because the channels may be different. The rake receiver will therefore receive encoded data from different sectors on different channels, demodulate those sectors independently, and then combine the data. When the data is combined through maximum ratio combining or other similar combining algorithms, the data from a strong channel may be weighted more heavily than data from a weak channel, which is likely to have more errors. Thus, the data with a higher likelihood of being correct is given higher weight in generating the final result.

When a MS is idle, a neighbor list which includes BSs that are neighbors to the active BS is received by the MS on a common channel. However, when a MS is active and communicating with a BS through a traffic channel, the neighbor set is updated on a traffic channel.

Any other BSs in the network that are not in the active, neighbor, or candidate sets (discussed below) comprise the remaining set. As illustrated in FIG. 3, whether a MS is idle or active, the network repeatedly sends overhead messages 30, 32 and 34 to the MS. These overhead messages contain information about the configuration of the network. For example, the extended neighbor list overhead message 34 tells the MS what neighbors exist and where to look for them. These neighbor identifiers are stored, at least temporarily, within the memory of the MS.

The candidate set is a set of BSs that the MS has requested as part of its active set, but have not yet been promoted to the active set. These candidate BSs have not yet been promoted because the network has not sent a hand-off direction message (HDM) to the MS in reply to the message from the MS, directing that MS change its active set to include these BSs. Typically, the exchange of such messages occurs as part of the handoff process, described below.

Handoffs

FIG. 4 depicts a generic structure of a wireless infrastructure 56. A client MS 36 continually monitors the strength of pilot channels it is receiving from neighboring BSs, such as BS 38, and searches for a pilot that is sufficiently stronger than a "pilot add threshold value" for handoffs (T_ADD), which can be a static value or dynamic value as described in the standards. The neighboring pilot channel information, known in the art as a Neighbor Set, may be communicated to the MS through network infrastructure entities including BS controllers (BSC) 40 that may control a cell cluster 42, and communicates with a mobile switching center (MSC) 44. It should be understood that the MS and one or more of these network infrastructure entities contain one or more processors for controlling the functionality of the MS and the network. The processors include memory and other peripheral devices well understood by those skilled in the art. As the MS 36 moves from the region covered by one BS 38 to another, the MS 36 promotes pilots having a signal strength greater than T_ADD from the Neighbor Set to the Candidate Set, and notifies the BS 38 or BSs of the promotion of certain pilots from the Neighbor Set to the Candidate Set via a Pilot Strength Measurement Message (PSMM). The PSMM also contains information on the strength of the received pilot signals. The BS 38 determines a new BS or network active set according to the received PSMM, and may notify the MS 36 of the new active set via an HDM. It should be noted, however, that the new active set may not always exactly comply with the MS's request, because the network may have BS resource considerations to deal with.

The MS 36 may maintain communication with all the BSs and BS sectors that are included in the new Active set. When the active set contains more than one BS, the MS is said to be in soft handoff with those BSs. When the active set contains more than one sector originating from the same BS, the MS is in softer handoff with those sectors.

The MS 36 typically maintains communications with all the BSs and BS sectors in the active set so long as the pilots for each BS are stronger than a "pilot drop threshold value" for handoffs (T_DROP). When one of the pilots weakens to less than T_DROP for a time exceeding T_TDROP (a time limit which prevents pilots with temporary dips in signal strength from being dropped), the MS 36 notifies the BSs of the change through a PSMM. The network may then determine a new active set that will typically not include the BS or sector whose pilot was reported to have degraded below T_DROP for a duration of T_TDROP, and notify the MS 36 of that new active set. Upon notification by the network, the MS 36 then demotes the weakened pilot to the Neighbor Set. This mechanism enables soft and softer handoffs. Note that most of the parameters used in the soft handoff process, such as T_ADD and T_DROP, are determined or at least limited by the network.

Soft handoff allows a MS to maintain communication with one or more BSs (sectors) simultaneously while the condition of any one of these links is not sufficient to allow successful communication through a single link. This also happens when the MS is moving away from a region served by one BS (sector) into a region that is served by a different BS (sector), to avoid any interruption in the communication between the MS and switching center.

It is typical for a MS 36 to be starting a handoff or in the process of handoff when connections fail and are dropped. This is expected because poor coverage or weak signal environments generally exist near cell boundaries, in areas where the signal to interference ratios change abruptly, in areas of pilot pollution, or areas significantly affected by cell breathing, capacity limitations, network resource availability, and network coverage, all which are well known in the art.

Dropped Connections

A dropped connection may manifest in a number of ways. FIG. 5 shows a situation known in the art as a Layer 2 Acknowledgment Failure for a CDMA wireless network. In the example of FIG. 5, the MS is transmitting a PSMM 48 requiring an acknowledgment by the BS. The BS may be receiving it correctly, but in the case shown in FIG. 5, the MS is not receiving the BS's acknowledgment (ACK) 46. The MS will retransmit the message $N_{1m}$ (=9) times in accordance with a retransmission counter and then terminate (drop) the connection. It is common for this type of failure to occur when the message that the Layer 2 Acknowledgment Failure occurs for is a PSMM 48 which includes a request for a pilot that is needed by the MS to maintain the connection.

FIG. 6 shows a second situation for which recovery is possible using the current invention in a CDMA wireless network. This situation is known in the art as a Forward Link Fade Failure. A fade is a period of attenuation of the received signal power. In this situation, the MS receives $N_{2m}$ (=12) consecutive bad frames 50, the response to which is to disable its transmitter 52. If it is then unable to receive $N_{3m}$ (=2) consecutive good frames before a fade timer expires after $T_{5m}$ (=5) seconds, the MS drops the connection 54. It is common for this type of failure to occur during the time that a MS promotes a pilot to the candidate set and needs to send a PSMM, or after a MS has sent a PSMM but before receiving a handoff direction message.

Layer 2 Acknowledgment Failures and Forward Link Fade Failures may occur because of excessively high frame error rates or bursty error rates. As illustrated in FIG. 7, a channel 58 may be broken up into slots 60, or superframes, typically of 80 millisecond duration. Each slot may be divided into three phases 62. These phases are numbered: 0, 1 and 2. Overlapping on top of the phases are four frames 64. These four frames are aligned with the three phases at the superframe boundaries. Each frame 64 is therefore typically 20 milliseconds long. Other frame sizes such as 5 ms, 10 ms and multiples of 20 ms can also be used. Preambles with various lengths can be transmitted prior to the data frames, for example, in case of reverse access channels and reverse common control channels. It should be understood that the content of the frames 64 can differ. One frame may contain pilot, signaling and data multiplexed on different code channels, another may contain only signaling, and yet another may contain only data. Each frame 64 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate. The network capacity can be increased as the interference is reduced.

In a practical communications network, it is neither realistic nor desirable to target an error rate of zero percent (i.e., all frames received properly). Rather, a frame error rate of one percent, for example, is targeted. Power control loops can be used to maintain a desirable frame error rate. In this example, if the frame error rate rises above one percent, then the power control loop might increase the power of signals transmitted by the MS so that the frame error rate decreases to approximately one percent. On the other hand, if the frame error rate is less than one percent, the power control loop may reduce transmitted power to save power, reduce interference, and allow the frame error rate to move up to one percent. The BS may therefore continuously instruct the MS, through power control bits in predetermined locations within a frame, to transmit at various power levels to maintain an error rate of approximately one percent as the MS moves around in a particular area, or other types of interferences begin or end. The MS typically abides by the power levels that are being recommended to it by the BS. In addition, the BS can also change its transmitter power for a particular channel, through similar power control loops. Thus, both the BS and the MS may continuously provide each other feedback in order to change the other's power levels. However, depending on its resource management such as channel power allocation limits, the BS may not necessarily change its transmitter power levels based on the feedback from the MS.

Despite the aforementioned power control loop, error rates may not be controllable to about one percent as a MS, which has limited transmitter power, moves about in a cellular network and experiences variations in signal strength and signal quality due to physical impediments, interference from adjacent channels, and positions near the edges of sectors. As the error rates rise to intolerable levels, dropped connections become a problem.

Rescue Procedures

Rescue procedures based on the reverse link or restarting the connection have previously been proposed. Generally, a rescue of a failing connection is possible if there is a sector (pilot) that would be capable of sustaining the connection if the failing MS had that pilot in its active set. Rescue procedures attempt to add these missing pilots to the MS and network active sets. Essentially, the MS adds pilots autonomously to its active set and, in the case of reverse-link initiated rescues, uses the updated active set to transmit a reverse rescue channel that is typically reserved (dedicated) and pre-arranged in advance. The network may also update its active set and transmit a forward rescue channel, also pre-arranged in advance so that the MS is able to detect such transmission. Typically, a channel assignment or handoff message may be used to complete the rescue by formally assigning the MS to a new active set that is synchronized with the network's active set.

Reverse-link-based rescue methodologies include common and dedicated channel methods. In a typical reverse based rescue procedure, the MS transmits a rescue channel, either on a common or dedicated channel, while the communications network utilizes one or more sectors in an attempt to demodulate the rescue channel.

Forward based rescue procedures have also been proposed. One such forward based rescue procedure is disclosed in U.S. utility application Ser. No. 09/978,974 entitled "Forward Link Based Rescue Channel Method and Apparatus for Telecommunication Systems," filed Oct. 16, 2001, which describes methods and apparatus for preventing loss of signal and dropped connections between a MS and the infrastructure in a telecommunications network. A connection as referred to herein includes, but is not limited to, voice, multimedia video and audio streaming, packet switched data and circuit switched data connections, short message sequences or data bursts, and paging. The procedure, which will be generally referred to herein as the Forward Rescue Procedure (FRP), allows systems to recover from failures at the MS or BS that would otherwise result in dropped connections. Examples of failure scenarios that can be overcome using the FRP include forward link Layer 2 (L2) acknowledgement failures and loss of forward link signal due to a fade that causes loss of signal frames for a period of time exceeding a threshold value. In response to a potential connection drop situation, a MS will autonomously add BS pilot channels to the active set of its rake receiver in order to rescue the connection in danger of dropping. Concurrently, the network infrastructure will initiate transmission on alternative forward link channels that are likely to be monitored by the MS during an FRP. If the same channels are monitored by the MS and transmitted on by the infrastructure, the connection in danger of dropping can be rescued.

The general FRP includes a MS FRP, and may also include an infrastructure FRP. FIG. 8 illustrates an example of the timeline of the MS FRP and infrastructure FRP in a typical connection rescue. Although the MS FRP is central to any rescue, the infrastructure FRP, although recommended, is not strictly necessary.

Triggering of the MS FRP depends upon the type of failure that occurs. In the case of a Layer 2 failure, the FRP is activated upon a number of failed retransmissions of a message requiring acknowledgments. In the case of a Forward Link Fade Failure, the FRP is activated if there exists a loss of signal for a period of time exceeding a threshold value (see reference character 72).

The MS starts an FRP timer at the time the rescue attempt is started (see reference character 74). If the FRP timer expires before the rescue is complete, then the connection is dropped. In addition, at the time the rescue attempt is started, the MS turns off its transmitter and selects a new active set (see reference character 74). In this embodiment, the MS effectively assumes a handoff direction based on the PSMM(s) that it has sent (whether or not the PSMM was actually sent, successfully sent, or acknowledged). In other words, the MS promotes pilots to the active set autonomously without a handoff direction (i.e. the new active set is the union of the old active set and the autonomously promoted active pilots: S"=S U S') (see reference character 76). The MS then begins to cycle through this new active set searching for a rescue channel. As noted above, although the term rescue channel encompasses the various schemes for defining channels as utilized by the various communication protocols, for purposes of simplifying the disclosure, a rescue channel will herein be identified as an Assumed Code Channel (ACC) (see reference character 78).

As noted above, the infrastructure FRP, although recommended, is not strictly necessary for every BS in the network. If the infrastructure FRP is implemented (see reference character 80), the infrastructure (network) selects sectors from which it will transmit the ACC.

In one embodiment of the FRP, null (blank) data is transmitted over the ACC during rescue. In other embodiments, data may be communicated over the ACC, although a MS would only hear this data if it actually finds and successfully demodulates that ACC.

At some point in time, the MS will find and demodulate $N_{3M}$ good frames of the ACC (see reference character 82), turn on its transmitter, and begins to transmit back to the BS. Once both the MS and BS receive a predetermined number of good frames, the rescue is completed (see reference character 84) and the BS may re-assign the MS to more permanent channels. Additionally, the network may re-assign the ACCs via overheads, for example. The BSs may also re-assign the MS active set to clean up after the rescue by sending a Rescue Completion Handoff message 86 which can re-use any existing handoff messages such as General or Universal Handoff Direction messages. For additional detail on an exemplary forward based rescue procedure, see U.S. utility application Ser. No. 09/978,974 entitled "Forward Link Based Rescue Channel Method and Apparatus for Telecommunication Systems," filed Oct. 16, 2001.

Mobile Station Transmitter Power Levels

In normal operation, a MS may transmit at power levels established by power control bits within data transmissions received from the network. Bits are "punctured" on the forward link, instructing the MS to go either up or down one step in power. "Punctured" means that every Xth bit in the output stream of the transmitting BS, before modulation, is replaced by a zero or one that tells the MS to go either up or down one step in power. These bits are not considered part of the data transmission, and are thus not error-corrected. Because the bits are punctured in fixed locations of the data stream known by the MS, the MS is able to read these bits as power control bits. The step size is provided in overhead messages. Specifying variable step sizes for adjusting MS transmitter power levels is disclosed in U.S. Pat. No. 5,896,411.

The MS's transmitter power level is a function of the power level received by the MS. The difference at any time between the receive and transmit power levels is typically a fixed difference (representing open-loop power control), plus or minus an additional amount defined by the power control bits (representing closed-loop power control). Thus, without closed-loop power control, the transmit power levels would "follow" the receive power levels, offset by the fixed difference. The power level adjustment defined by the power control bits represents the sum of all previously received power control bits. In other words, an entire series of "up" and "down" steps must be taken into account in order to determine the net (present) power level.

Table 1, shown below, summarizes the computation of a MS's mean transmitter output power in dBm during normal operation. The mean transmitter output power is computed by adding an offset power (second row of Table 1) to the negative of the MS's mean received input power (first row of Table 1). Note that "mean received input power" as referred to herein may refer to the instantaneous mean power measured over the time of the last power control group (e.g., 1.25 ms), or may refer to other methods understood by those skilled in the art to indicate receive power. The offset power is a fixed amount representing open-loop power control. For example, if the mean received input power is −106 dBm and the offset power is determined to be −76 dB, the mean transmitter output power is −(−106 dBm)+(−76 dB)=30 dB.

In addition, power representing closed-loop power control (third row of Table 1) may also be added to the MS's mean transmitter output power. In cases where the signal environments are identical, using the offset power alone would be sufficient. However, closed loop power control is supplied because the uplink (reverse link) and downlink (forward link) may experience different signal environments called a forward/reverse link imbalance.

TABLE 1

Mean Mobile Station Normal Transmit Output Power (dBm)

| Term | Description |
| --- | --- |
| − mean receive input power [dBm] | receiver automatic gain control (AGC) block received signal strength indicator (RSSI). |
| + offset power (open loop power control) | Determined by linearizer calibration procedures and software interpretation. For example, for band class 0 this value should correspond to −73 dB and for band class 1 this value should correspond to −76 dB. |
| + closed loop power control | Summed by transmitter AGC block circuits |

FIG. 9 is a block diagram of a conventional MS transceiver. In the receive path, signals received at the antenna are passed through the duplexer 90 and amplified by a low noise amplifier (LNA) 92. The LNA 92 is used for minimizing intermodulation distortion (IMD), which is interference between adjacent carriers. The received signals are then gain-adjusted by a receiver automatic gain control block (AGC) 94 and downconverted to baseband by an intermediate frequency (IF) block 96. Note that the AGC block 94 also measures and generates a received signal strength indicator (RSSI). The baseband signals are processed in a baseband block 98, which contains rake receivers, correlators, interleaving, decoders, and the like. In the transmit path, baseband signals are upconverted by the IF block 96, after which their gain in adjusted by the transmit automatic gain control (TX AGC) block 150 using the RSSI as power control. The IF signals are then amplified by power amplifier PA 152 and passed through the duplexer 90 to the antenna 88. One or more processors 154 provides control for the transceiver.

During rescue, whether a rescue procedure is reverse or forward based, at some point during the rescue the MS must transmit on the reverse link. For example, in a reverse-based rescue procedure, the MS will transmit a rescue channel. In a forward based rescue procedure, after receiving a rescue channel from the network, the MS may transmit data or messaging information. In either case, when transmitting on the reverse link during rescue, the power level of the MS's transmitter must be established.

One method of establishing the MS's transmitter power level would be to start MS transmissions at the last power level used by the connection before the rescue started. Using this methodology, the previously described closed loop power control would be disabled so that the MS's transmission power is constant. However, the last power level used by the connection is likely to be near maximum power because prior to the connection failure, the connection was likely experiencing high frame error rates and therefore was likely to have been power controlled towards maximum power levels by the network.

Therefore, a need exists for a method and apparatus that determines an efficient and reliable power level for the MS's transmitter for reverse link communications during a rescue procedure, to rescue dropped calls quickly and with a high success rate.

SUMMARY OF THE INVENTION

During a connection rescue, whether a rescue procedure is reverse or forward based, at some point during the rescue the MS must transmit on the reverse link. For example, in a reverse-based rescue procedure, the MS will transmit a rescue channel. In a forward based rescue procedure, after receiving a rescue channel from the network, the MS may transmit data or messaging information. In either case, when transmitting on the reverse link during rescue, the power level of the MS's transmitter must be established.

Embodiments of the present invention are directed to a mechanism by which open-loop power control (wherein transmit power is a function of receive RSSI) can be supported during the rescue. When rescue transmission is started, closed loop power control is disabled, and the open-loop power control is adjusted, in part, based on changes in received power, to determine the MS's mean rescue transmission output power level.

In one embodiment, MS's mean rescue transmission output power level is computed by first determining the MS's mean rescue receive input power level at the time the MS resumes transmitting. The MS's mean rescue transmission output power level is then computed by adjusting the negative of the MS's mean rescue receive input power level using up to four parameters. These four variables are (1) a pre-rescue power delta, (2) a rescue interference delta, (3) a rescue delay compensation value, and (4) a pre-determined value.

The pre-rescue power delta is computed by subtracting the MS's mean receive power level from the MS's transmit power level at the time of the last transmission of the power control group (power control bits) by the network before a rescue is triggered. When MS transmission is started during rescue, the MS's mean rescue transmission output power level may be computed by adding the pre-rescue power delta to the negative of the mean rescue receive input power level to compensate for the lack of closed loop power control in the rescue period.

The MS may also add a rescue interference delta to the MS's mean rescue transmission output power level, where the rescue interference delta represents the difference between an interference correction term for the normal active set (at the end of the transmission before rescue) and an interference correction term for the updated rescue active set.

The MS may also add a rescue delay compensation value to the MS's mean rescue transmission output power level to account for the increased uncertainty in computing a new mean rescue transmission output power level as the time t between the start of the fade and start of the MS's transmission increases. Generally, as t increases, more uncertainty is introduced in computing a new MS transmit power level and the more desirable it may be to boost the initial rescue transmission power level.

In addition to the above-described adjustments that may be made by the MS, the MS may receive from the network, prior to rescue, a pre-determined value to be added to the MS's mean rescue transmission output power level to compensate for delays, uncertainty in the missing closed loop power control, or to increase the chance of a successful rescue. This pre-determined value may be specified by the network or a standard.

These and other features and advantages of embodiments of the present invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may reference the CDMA communication protocol (code-based protocols) for purposes of explanation only, embodiments of the present invention are applicable to other communication protocols and digital radio technologies generally, and include, but are not limited to, CDMA, TDMA, FDMA, GSM, GPRS, and the like.

Embodiments of the present invention are directed to a mechanism by which open-loop power control (wherein transmit power is a function of receive RSSI) can be supported during the rescue. When rescue transmission is started, closed loop power control is disabled, and the open-loop power control is adjusted, in part, based on changes in received power.

Figure 1:
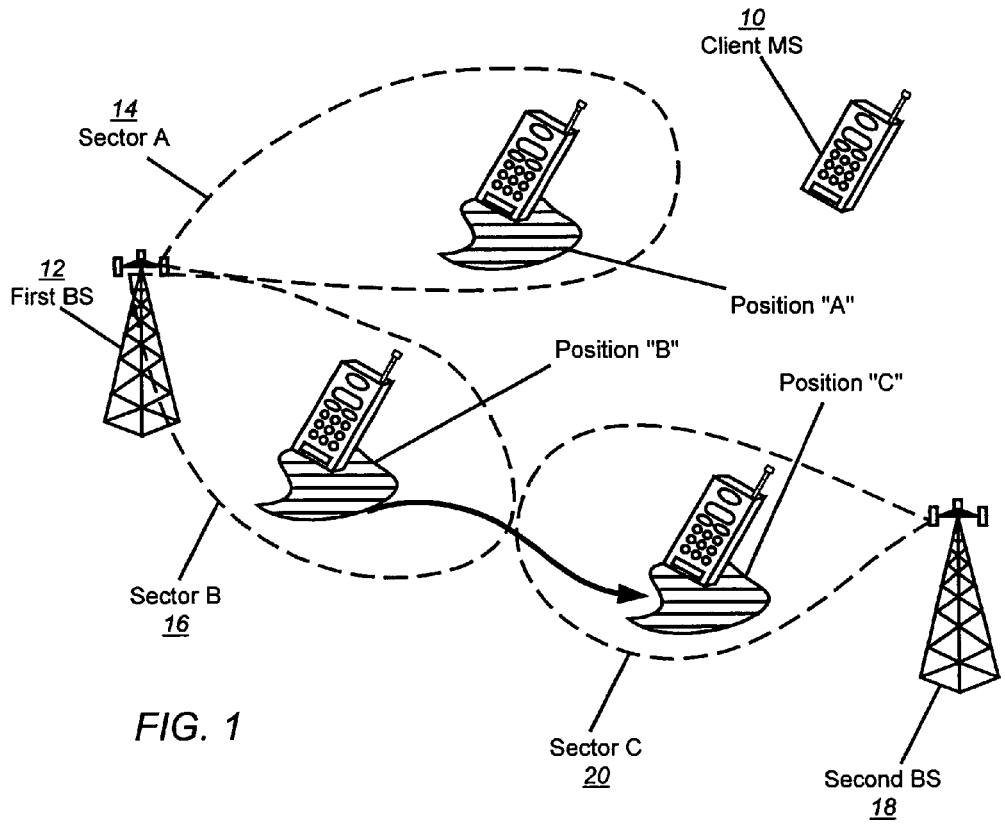
FIG. 1 illustrates a roving mobile station moving amongst different locations between sectors in a wireless communication system.
Figure 2:
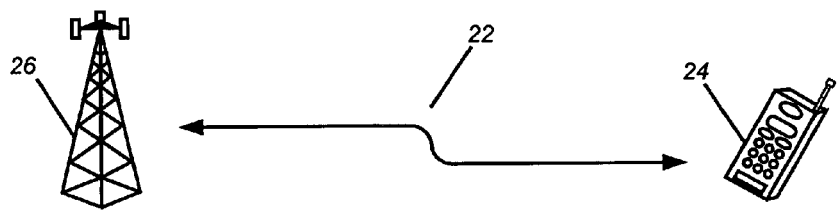
FIG. 2 illustrates an exemplary communication link between a mobile station and a base station in a wireless communication system.
Figure 3:
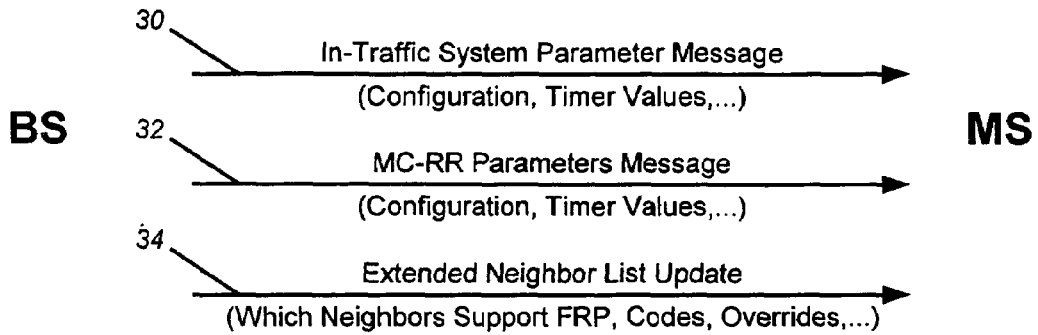
FIG. 3 illustrates overhead messages communicated from a base station to a mobile station in a wireless communication system.
Figure 5:
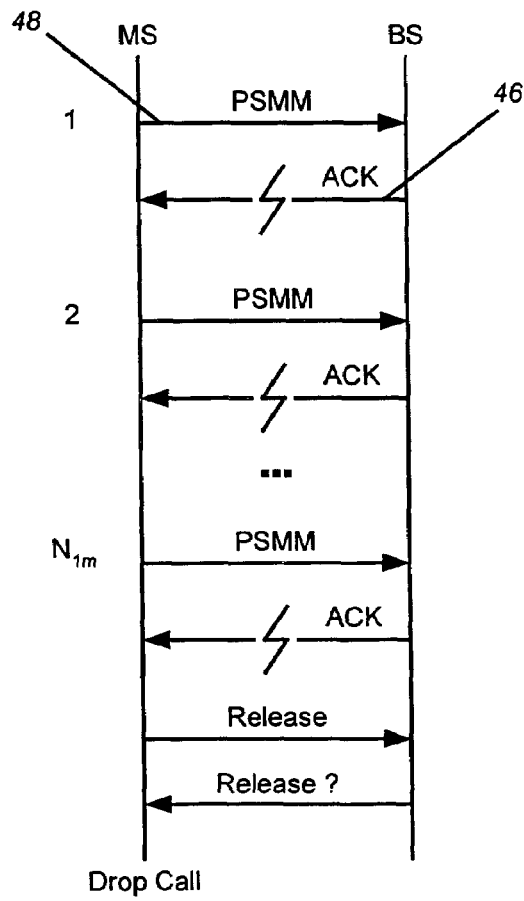
FIG. 5 is a message sequence between a mobile station and a base station resulting in a dropped connection due to Layer 2 Acknowledgement failure.
Figure 4:
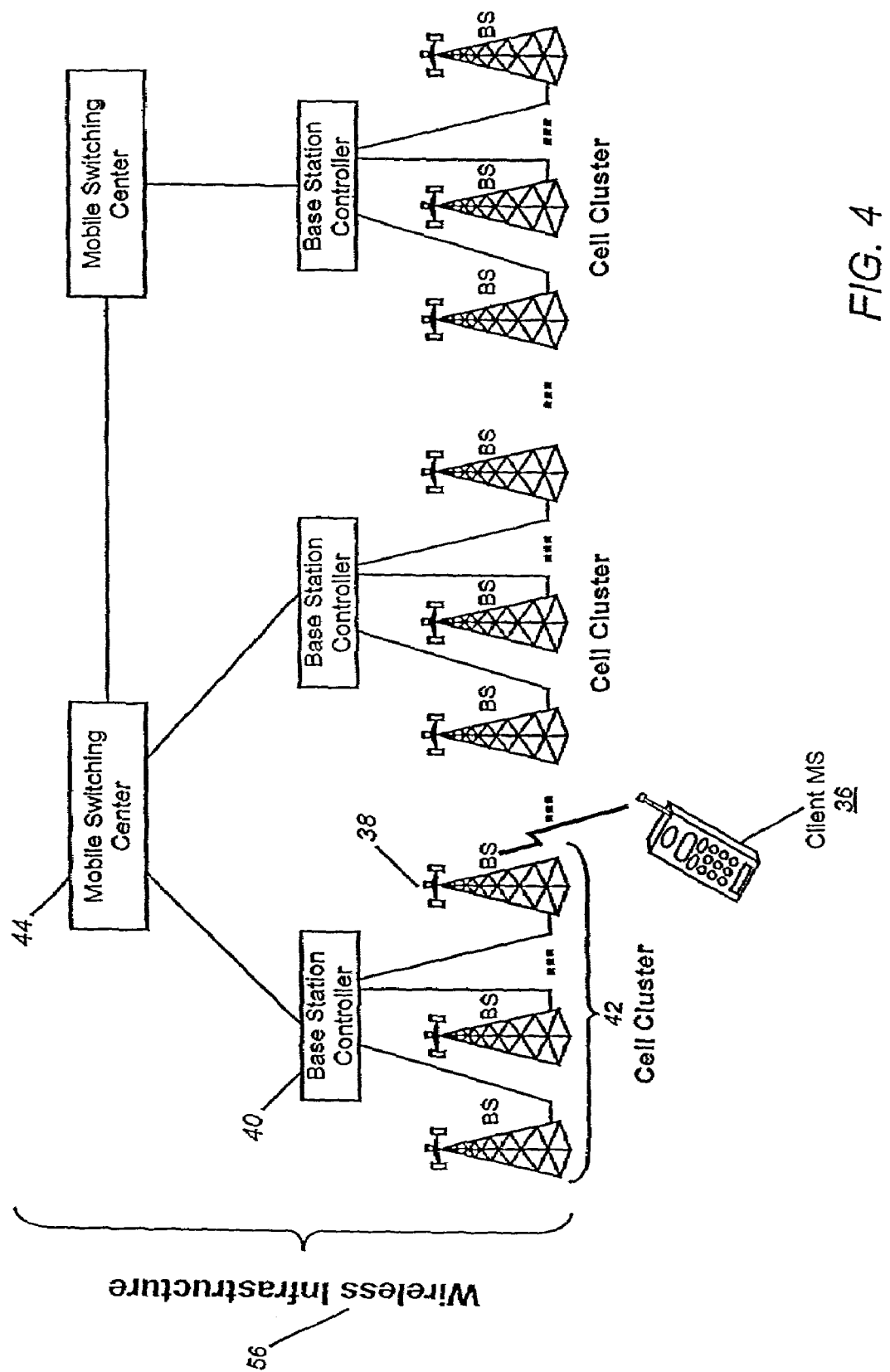
FIG. 4 illustrates a wireless communication infrastructure in communication with a roving mobile station.
Figure 6:
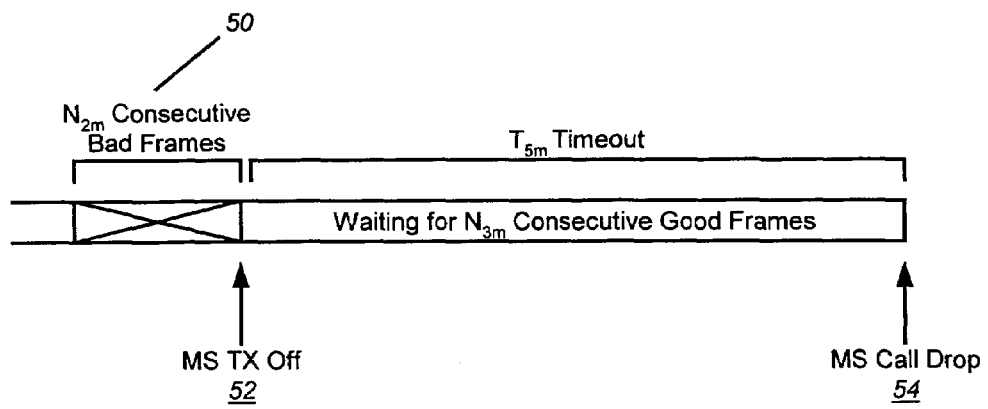
FIG. 6 is a timeline that is representative of a dropped connection resulting from fading of the forward link in a wireless telecommunications network.
Figure 7:
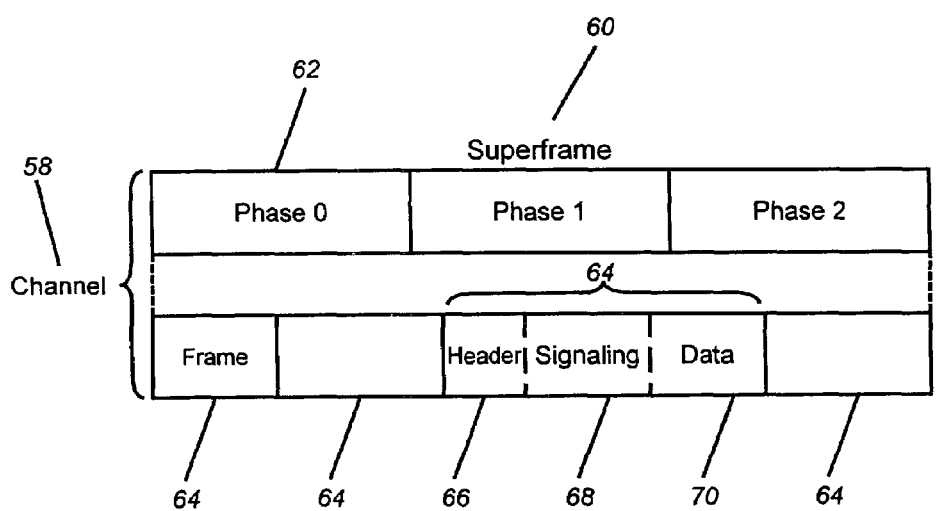
FIG. 7 is a timeline of a superframe, divided into three phases and four frames, for use in a wireless telecommunications network.
Figure 8:
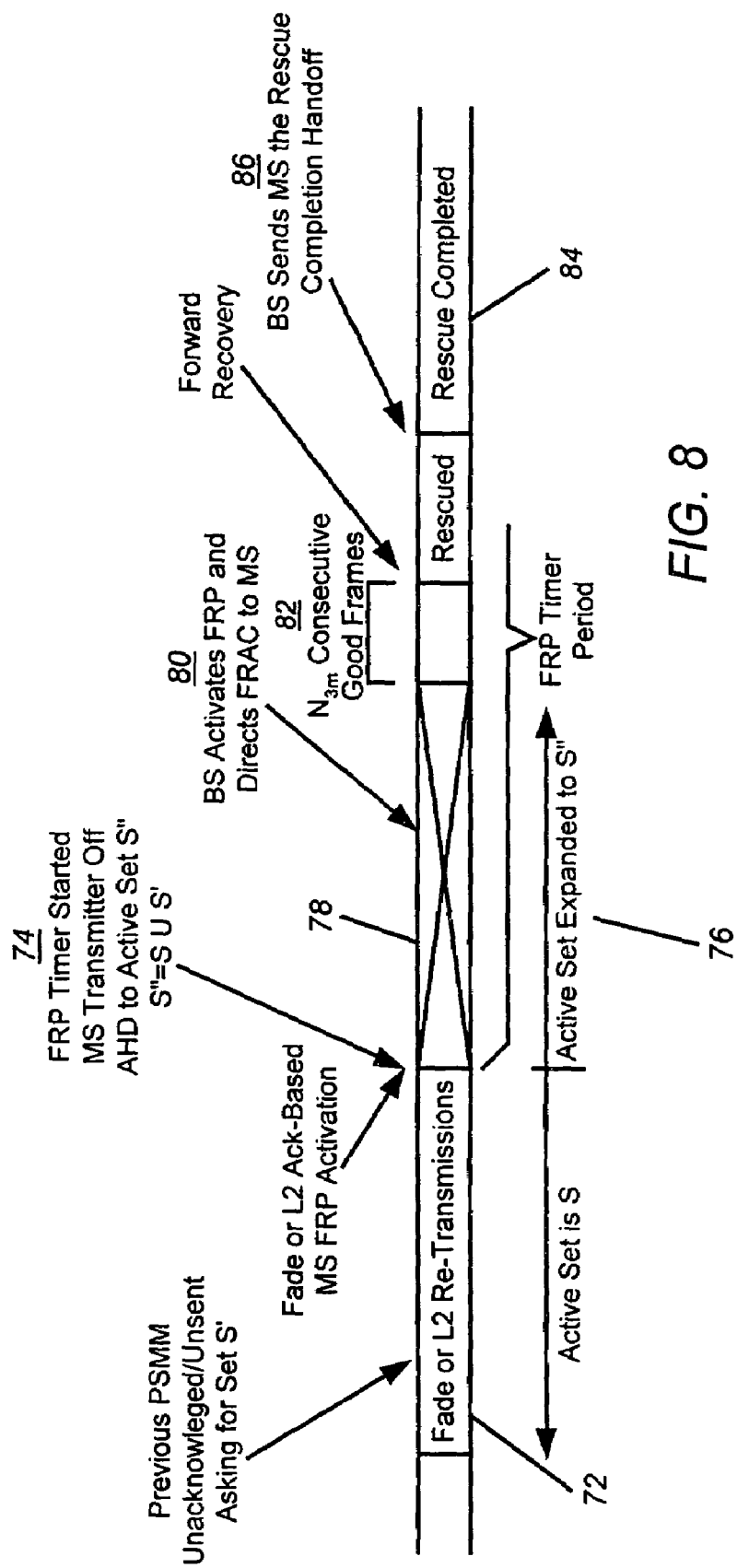
FIG. 8 is a timeline of one embodiment of the Forward Rescue Procedure when it is activated.
Figure 9:
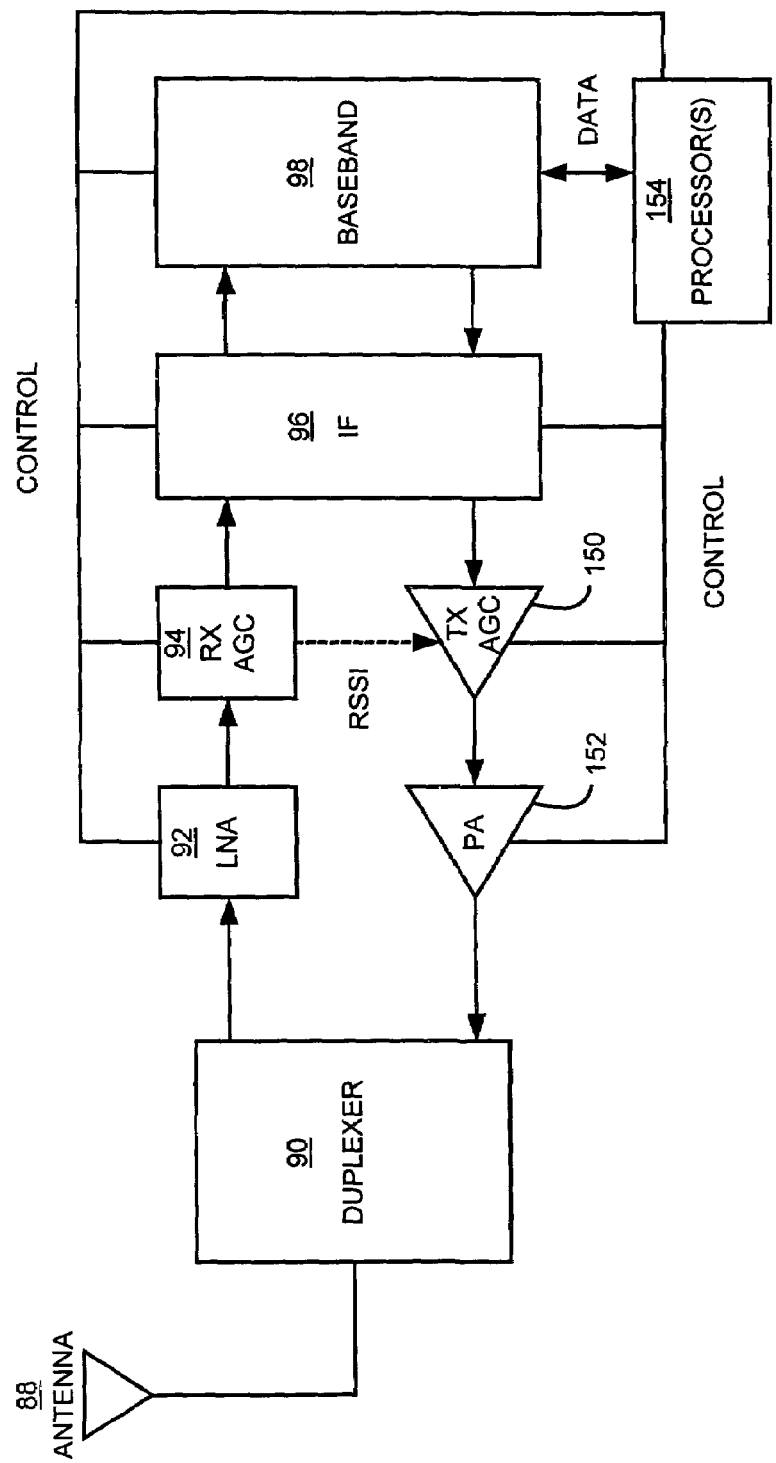
FIG. 9 is a block diagram of a conventional MS transceiver.
Figure 10A:
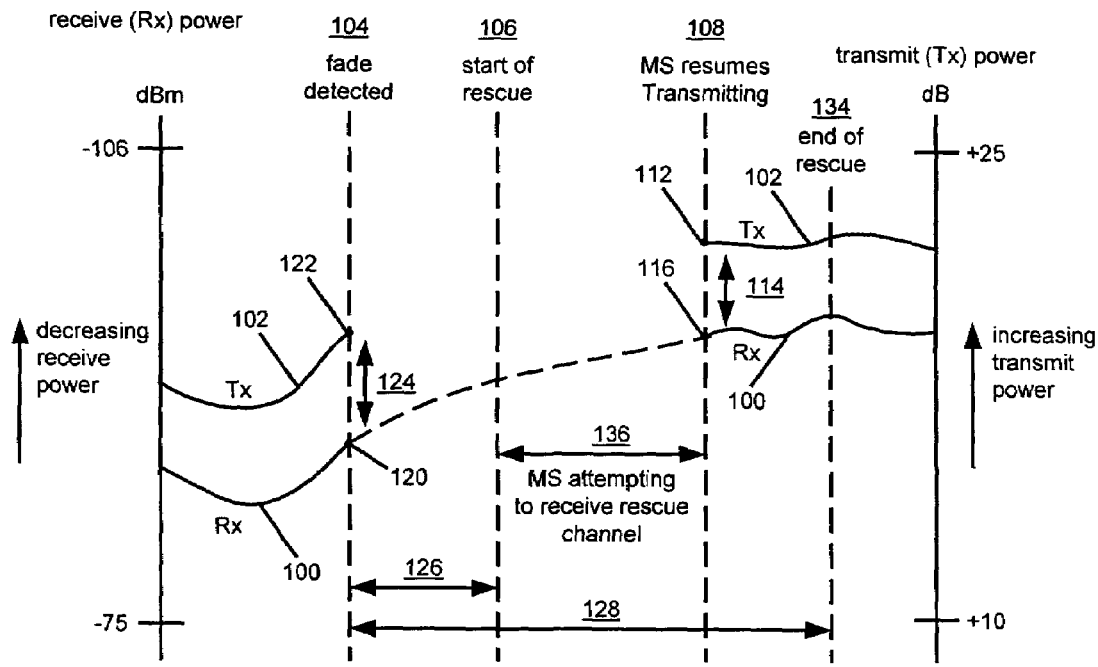
FIG. 10a is a timeline of receive and transmit power prior to and during a forward-based rescue operation according to an example embodiment of the present invention.

FIG. 10a is a timeline of receive and transmit power prior to and during a forward-based rescue operation according to an example embodiment of the present invention. The Rx plot 100 represents a MS's mean receive input power, which is total received dBm power (RSSI) for a particular channel. The Tx plot 102 represents a MS's transmit power. Note that received power plots and levels 100, 120 and 116 are associated with the scale at the left, while transmit power plots and levels 102, 122 and 112 are associated with the scale at the right. In the example of FIG. 10a, the MS's mean receive input power 100 varies between about −106 to −75 dBm and the MS's transmit power varies between about +10 to +25 dB in normal (non-rescue) operation. In the example of FIG. 10a, prior to the detection of a fade at time 104, the MS's mean receive input power 100 is generally decreasing (resulting in an upward curve), and at the same time, the MS's transmit power 102 is increasing because it generally follows the receive power levels 100 in the absence of any major trend in the closed loop power control bits. At some point in time 104, a fade is detected, the MS turns off its transmitter, and subsequently a forward rescue procedure is initiated at time 106. Note that the time 104 is not the time at which a fade first starts, but rather, the time at which a fade is detected by processors in the MS.

During the forward rescue procedure, the MS will attempt to receive a rescue channel from the network (see reference character 136). At some later time 108, if the MS is able to successfully receive a rescue channel, the MS resumes transmitting on the reverse link, some acknowledgement and handoff messaging may be exchanged between the MS and the network, and the rescue procedure ends with the connection being continued at time 134. At that time, the MS's mean rescue receive power level 116 may have changed from its pre-rescue level 120.

Figure 11:
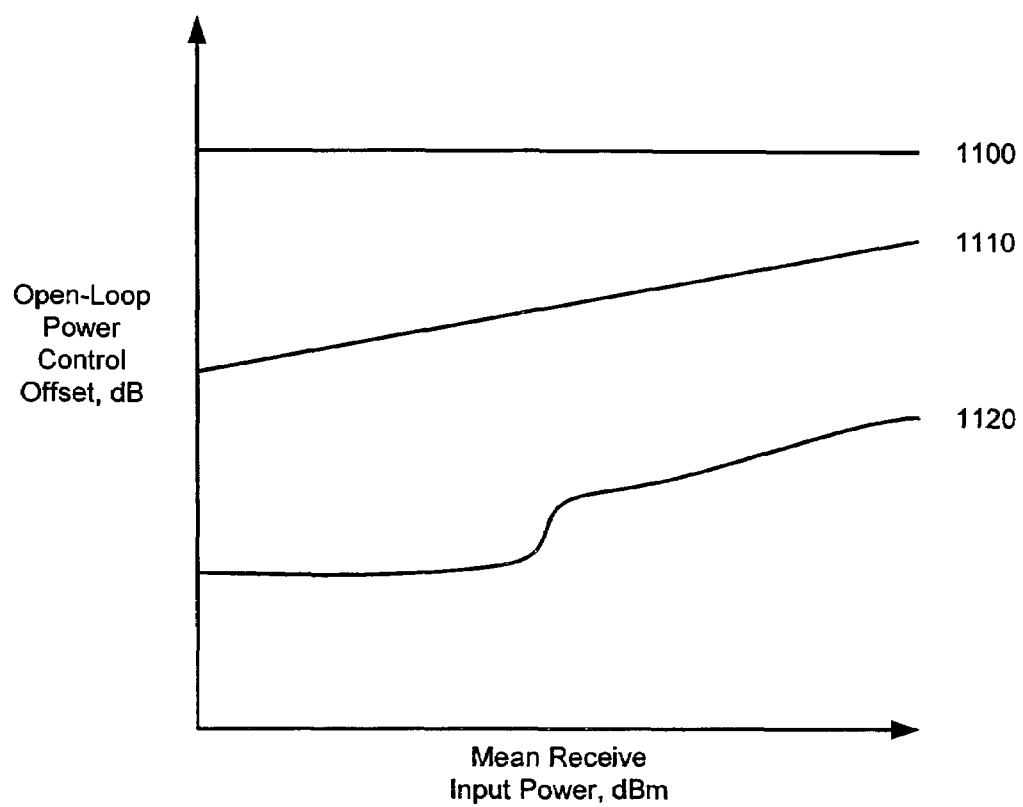
FIG. 11 is a plot of MS mean rescue receive input power versus open-loop power control offset according to an embodiment of the present invention.

Embodiments of the present invention compute the MS's mean rescue transmission output power level 112 by first determining the MS's mean rescue receive input power level 116 at the time the MS resumes transmitting at time 108, and then relating the MS's mean rescue transmission output power level 112 to the MS's mean rescue receive input power level 116, represented by a delta power level 114. This delta power level 114 inherently includes an offset that relates the MS's mean rescue transmission output power level 112 to the MS's mean rescue receive input power level 116. As illustrated in FIG. 11, the relationship between this offset and the MS's mean rescue receive input power level 116 may be fixed (or constant) 1100, linear 1110, or defined by a higher-order polynomial function 1120, depending on the nature of the communications environment. Although FIG. 11 illustrates a number of embodiments of mean receive input power level versus this offset, the invention is not limited to these embodiments and may use a table lookup or other means of relating mean receive input power level to transmission output power in an open-loop fashion.

The negative of the mean rescue receive input power level 116 may be adjusted by the delta power level 114 using up to four parameters to produce the MS's mean rescue transmission output power level 112. These four parameters are (1) a pre-rescue power delta, (2) a rescue interference delta, (3) a rescue delay compensation value, and (4) a pre-determined value, and are described in greater detail below. Note that the MS's mean rescue transmission output power level 112 may be recomputed during rescue due to changes to the MS's mean receive input power level 116. In addition, the selected parameters comprising the delta power level 114 may be dynamically recalculated during the rescue, or parameters may be added to or deleted from the computation of the delta power level 114 as the rescue progresses, resulting in a varying delta power level 114 from time 108 to the end of the rescue at time 134. It should also be understood that after the rescue is complete at time 134, the difference between the MS's receive power 100 and the transmit power 102 may vary in accordance with power control bits received by the MS.

Figure 10B:
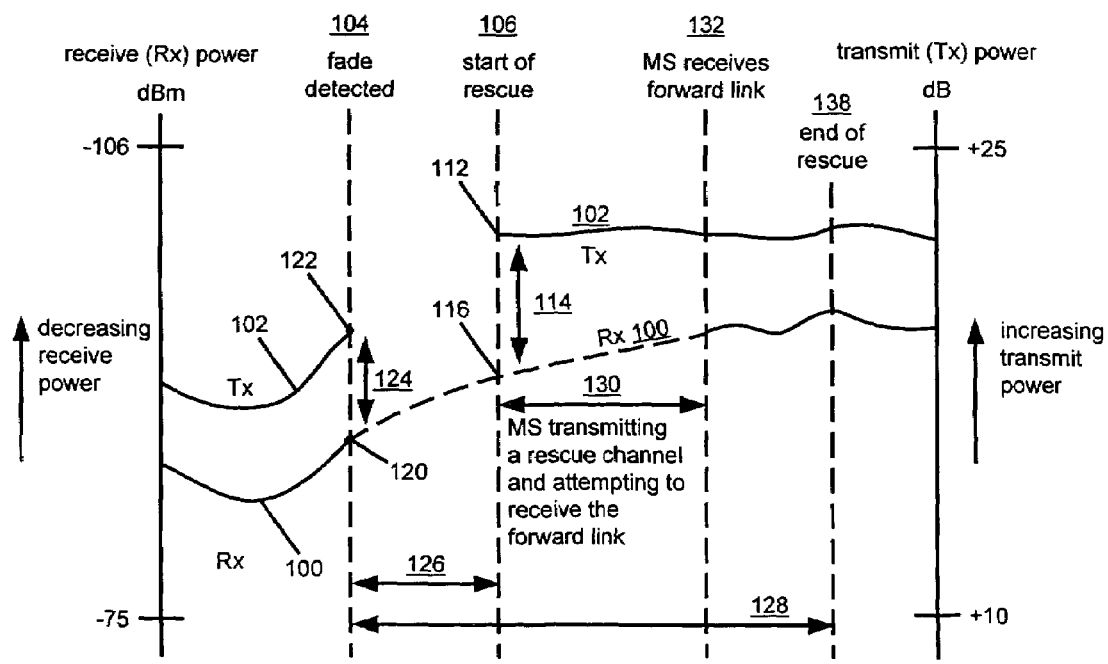
FIG. 10b is a timeline of receive and transmit power prior to and during a reversed-based rescue operation according to an example embodiment of the present invention.

FIG. 10b is a timeline of receive and transmit power prior to and during a reverse-based rescue operation according to an example embodiment of the present invention. In the example of FIG. 10b, at some point in time 104, a fade is detected, the MS turns off its transmitter, and subsequently a reverse rescue procedure is initiated at time 106. At that time, the MS's mean rescue receive power level 116 may have changed from its pre-rescue level 120. During the reverse rescue procedure, the MS will transmit a rescue channel to the network and at the same time attempt to receive the forward link from the network (see reference character 130). As with forward rescue procedures, embodiments of the present invention utilizing reverse rescue procedures determine the MS's mean rescue transmission output power level 112 by relating the MS's mean rescue transmission output power level 112 to the MS's mean rescue receive input power level 116 at the start of rescue 106, represented by a delta power level 114. This delta power level 114 inherently includes an offset that relates the MS's mean rescue transmission output power level 112 to the MS's mean rescue receive input power level 116. As illustrated in FIG. 11, the relationship between this offset and the MS's mean rescue receive input power level 116 may be fixed (or constant) 1100, linear 1110, or defined by a higher-order polynomial function 1120.

The negative of the mean rescue receive input power level 116 may be adjusted by the delta power level 114 using one or more of the previously described four parameters. If, at some later time 132, the MS is able to successfully receive the forward link channels directed to that MS, then some messaging such as handoff or acknowledgement messages may be exchanged between the MS and the network, the connection can be continued, and the rescue can be completed at time 138.

The four parameters described above that may comprise the delta power level 114, the MS's mean receive input power level 116, and their contributions to a MS's mean rescue transmission output power level 112 are illustrated in Table 2 and discussed individually below. It should be understood that one or a combination of the four parameters (pre-rescue power delta, rescue interference delta, rescue delay compensation value, and the pre-determined value) may be used to compute the delta power level 114, as long as the offset representing open loop power control is inherent in the computation of the delta power level 114. Because the offset is inherent in the pre-rescue power delta, the pre-rescue power delta may be used alone or in combination with one or more of the other three parameters to compute the delta power level 114. Alternatively, the pre-determined value, if it includes the offset, may be used alone or in combination with one or more of the other three parameters to compute the delta power level 114.

TABLE 2

Mean Mobile Station Rescue Transmission Output Power (dBm)

| Term | Description |
|---|---|
| − mean rescue receive input power [dBm] | receiver AGC block RSSI. |
| + pre-rescue power delta | Rescue power control offset to compensate for lack of closed loop power control (disabled). |
| + rescue interference delta | This is the difference between the interference term computed for the active set and the interference term computed for the rescue set. |
| + rescue delay compensation value | Compensation for delay during rescue |
| + pre-determined value | pre-determined compensation (constant, configured, or communicated from the network) |

Pre-Rescue Power Delta

In one embodiment of the present invention, the MS measures and stores both transmit and mean receive power levels at the time of the last reliable receipt of the power control group (power control bits) from the network before a potentially failing connection is detected. In the examples of FIGS. 10a and 10b, the time of the last reliable receipt of the power control group is approximately the time 104 that a fade was detected, and the MS's transmit and mean receive power levels at that time are indicated by reference characters 120 and 122, respectively. The pre-rescue power delta 124 is then computed by subtracting mean receive power 120 from transmit power 122. Note that the pre-rescue power delta 124 will include the previously described offset as well as the closed loop power control. When MS transmission is started during rescue at time 108, the pre-rescue power delta 124 is added to the negative of the mean rescue receive input power level 116 to compensate for the lack of closed loop power control in the rescue period.

Note that the description above for computation of the pre-rescue power delta 124 is based on using the power levels at the time of the last reliable receipt of the power control group before a potentially failing connection was detected. This time may be defined as the last point in time when reliable power control was possible. Reliable power control may be defined in a number of ways, including receipt of power control bits, for example. The reliability of power control bits may be based on the symbol or bit error rate of the frame in which the power control bits are punctured. These power control bits may be received significantly earlier than the start of the rescue. The more time between the last reliable receipt of power control bits and the start of rescue, the more likely it becomes that conditions will have changed. Therefore, in another embodiment of the present invention, as the time between the last reliable receipt of the power control group and the detection of a potentially failing connection (e.g. a fade) increases (see reference character 126 in FIGS. 10a and 10b), a larger offset should be used to compensate. This offset can increase, for example, as a function (e.g. linear or higher-order polynomial) of the time 126 between the last reliable receipt of the power control group and the detection of the potentially failing connection. The coefficient(s) defining the function may be pre-stored in the MS or communicated by the network to the MS in a message prior to rescue.

In further embodiments, other time references could be used. For example, an average of one or both of the received and transmitted power levels over the last frame transmitted could be used to compute the pre-rescue power delta.

Rescue Interference Delta

As described above, a MS will maintain an active set $A_N$ during normal operation, and then autonomously generate an updated rescue active set $A_R$ during a rescue. $A_N$ can be represented by a weighted sum of pilot strengths $PS_N$, while $A_R$ can be represented by a weighted sum of pilot strengths $PS_R$. The sectors/BSs in the MS's updated rescue active set are likely to be different from the normal active set, and are also likely to be received with a different level of interference from the normal active set. For this reason, in embodiments of the present invention the MS may apply a rescue interference delta representing the difference between an interference correction term for the normal active set (at the end of the transmission before rescue) and an interference correction term for the updated rescue active set.

The interference correction terms are computed as a function of the PS values (combined pilot Ec/Io values) for the active set. For example, the interference correction (IC) terms for the normal active set $IC_N$ and the updated rescue active set $IC_R$ may be computed as follows:

$$IC_N = \min(\max(\text{OFFSET} - PS_N, \text{LO\_IC}), \text{HI\_IC}) \text{ dB}$$

and $$IC_R = \min(\max(\text{OFFSET} - PS_R, \text{LO\_IC}), \text{HI\_IC}) \text{ dB},$$

where OFFSET is the highest value in a range of significant PS values. OFFSET is used to map this highest significant PS value to a lowest value LO_IC in a range of useful IC terms, and is also used to map each significant PS value to a useful IC term ranging from LO_IC to HI_IC. Generally, therefore, each equation above maps a large number of possible PS values, including the significant PS values, to a small range of useful IC terms limited by LO_IC and HI_IC. Note that the highest significant PS value (i.e. OFFSET) and all PS values greater than OFFSET will be mapped to the lowest useful IC value LO_IC, while the lowest significant PS value and all PS values less than the lowest significant PS value will be mapped to the highest useful IC value HI_IC.

The OFFSET value may be selected based on estimated or empirically determined significant combined pilot strength values (or conversely, estimated or empirically determined insignificant combined pilot strength values whose effect on the MS's mean rescue transmission output power level will be treated in a like manner), while LO_IC and HI_IC may be selected depending on the maximum desired contribution of the rescue interference delta to the MS's mean rescue transmission output power level. The OFFSET, LO_IC and HI_IC values may be pre-stored in the MS or communicated by the network to the MS in a message prior to rescue. Useable (significant) PS values typically range from about −5 to about −18 dB. This range will depend on the network configuration or system design. The OFFSET may therefore be chosen to coincide approximately with the start of the useable range (e.g. −5 dB, the highest value in a range of useable PS values). The lowest value in the range of useable PS values is determined by the capability of the MS modem (i.e. the searcher sensitivity and rake receiver limitations). Typically the rake receiver may detect signal levels as low as approximately −25 dB, but only reliably down to approximately −20 dB.

Once the IC terms are computed, the rescue interference delta can be computed. In embodiments of the present invention, the rescue interference delta is equal to:

$$IC_R - IC_N.$$

In other embodiments, the rescue interference delta may be recomputed during execution of the rescue procedure as the updated rescue active set of pilots $A_R$ or the combined normal pilot strength value $PS_R$ changes. The recomputation may occur at fixed time intervals to reflect possible changes in $A_R$ or $PS_R$, or may occur only when a change in $A_R$ or $PS_R$ is detected during the rescue procedure.

An example of the computation of the rescue interference delta will now be provided for purposes of illustration only. If it is desired to map a large number of possible PS values to a range of useful IC terms from 0 to 7 (representable by a 3-bit binary number), where the highest significant PS value −7 would be mapped to 0, the lowest significant PS value −14 would be mapped to 7, etc., then the IC terms would be computed as follows:

$IC_N = \min(\max(-7-PS_N, 0), 7)$ dB $IC_R = \min(\max(-7-PS_R, 0), 7)$ dB

The results of the subsequent mapping for $IC_N$ are shown in Table 3 below.

TABLE 3

Example Mapping of $PS_N$ to $IC_N$
With a Range of 0 to 7, and an Offset of −7

| $PS_N$ | $IC_N$ |
|---|---|
| <−14 | 7 |
| −14 | 7 |
| −13 | 6 |
| −12 | 5 |
| −11 | 4 |
| −10 | 3 |
| −9 | 2 |
| −8 | 1 |
| −7 | 0 |
| >−7 | 0 |

For example, if $PS_R = -11$ dB and $PS_N = -14$ dB, then $IC_R = 4$ dB and $IC_N = 7$ dB, and the rescue interference delta is −3 dB. In this example, the pilots in the rescue active set $A_R$ are 3 dB stronger than the pilots in the normal active set $A_N$, and thus the BSs in $A_R$ are receiving the MS better than the BSs in $A_N$, less MS transmit power is needed, and in the present example, the MS's transmit power is lowered by 3 dB. This assumes that there is no significant link imbalance. Note that if the specific PS values are within the range −7 to −14 dB (a range of 7 with an OFFSET of −7), as in the example above, the mapping of PS values to IC values is not necessary, because the same result can be obtained merely by performing the computation $PS_N - PS_R$, which equals −14−(−11) or −3 dB. However, if the specific PS values are outside the range −7 to −14 dB, then the mappings defined by the equations above must be used. For example, if $PS_R = -6$ dB and $PS_N = -17$ dB, then $IC_R = 0$ dB and $IC_N = 7$ dB, and the rescue interference del is −7 dB. Note that in this example, $PS_N - PS_R$ would yield −11 dB, a different result.

In another embodiment, the IC terms can be based on criteria other than the PS values of the normal and rescue active sets. For example, an average pilot strength value could be used. Additionally, the strength of a single pilot could be used, such as the earliest (closest) pilot, a reference pilot (the pilot used by the MS as a timing reference), or the weakest or strongest active set pilot. Alternatively, the strongest normal active set pilot may be used in combination with the weakest rescue active set pilot to maximize power.

Note that the rescue interference delta compensates for interference differences and does not accomplish the same thing as the MS's mean rescue receive input power level. Consider, for example, a case where the MS's mean rescue receive input power level has improved during the rescue procedure (i.e., the MS's mean receive input power level was lower before the failure, and increased during rescue). In this case, incorporating the pre-rescue delta would, alone, cause the transmit power to be relatively lower because the MS's mean rescue receive input power level is now higher than before the failure. However, if the MS's receive interference increases so that the received signal strength of the MS's rescue active set is now smaller than the received signal strength of the MS's previous (pre-rescue) active set, while the MS's mean rescue receive input power level suggests a lower transmit power should be used, the rescue interference delta suggests a higher transmit power should be used, which counteracts the MS's mean rescue receive input power level adjustment.

Rescue Delay Compensation

Referring again to the examples of FIGS. 10a and 10b, between time 104, which may be defined as the last point in time when reliable power control was possible, and the end of rescue 134 or 138 is a time represented by time 128. Reliable power control may be defined in a number of ways, including receipt of power control bits, or reception of the forward link, for example. Note that in FIG. 10a, the rescue could possibly be completed at any time after time 108, while in FIG. 10b, the rescue could possibly be completed at any time after time 106. However, as the rescue progresses without completion and the time 128 becomes longer, more time elapses from the MS's last receipt of power control bits, and there is an increased chance that the location of the MS has changed and/or the environment has changed. Generally, as time 128 increases, more uncertainty is introduced in computing a new required MS transmit power level 112. In embodiments of the present invention, the rescue delay compensation value attempts to take increasing time 128 into account. Generally, the longer the time 128, the more likely it is that conditions have changed, and thus more power is added to compensate. The rescue delay compensation value could be, for example, a function (e.g. linear) of the time 128, a constant value multiplied by a coefficient that may be pre-stored in the MS or communicated by the network to the MS in a message prior to rescue. The rescue delay compensation value will increase and may be recomputed at fixed time intervals as the delay time 128 increases. The coefficient may also be adjusted by the MS as the rescue proceeds.

In other embodiments, the time 128 could be computed starting from the time the MS's transmitter was turned off, the start of a fade, when a fade is declared by the MS, when the fade conditions started, or the last point in time when the power control bits were received reliably (as defined by a frame error rate threshold, for example).

Pre-Determined Value

In another embodiment of the present invention, the delta power level 114 may include a pre-determined value. Generally, the purpose of the pre-determined value is to increase the MS's mean rescue transmission output power level to optimize the chance that the MS's rescue transmission will reliably received, while ensuring that the MS does not use an excessively high transmit power level. The pre-determined value may be communicated from the network to the MS during messaging prior to the start of a rescue. In another embodiment, the pre-determined value may be fixed in the MS.

In one embodiment, the previously described offset contributed by open loop power control may be included in the pre-determined value to compensate for missing closed loop power control. In other embodiments, the pre-determined value may be determined by network engineers, and/or adaptively based on historical, empirical, or statistical information. For example, this information may demonstrate that adding up to a certain threshold amount of transmit power to the delta power level generally results in a satisfactory rescue speed or success improvement per dB of power ratio, but adding power above that threshold results in an unsatisfactory ratio, taking into account user needs and MS limitations. This threshold may therefore be selected as the pre-determined value.

OTHER EMBODIMENTS

Embodiments of the present invention described hereinabove disclose mechanisms for computing a MS's mean rescue transmission output power level 112. However, this output power level need not be constant throughout the rescue. For example, in other embodiments, the MS's mean rescue transmission output power 112 can be adapted based on closed loop power control. In reverse-based rescues (see FIG. 10b), power control bits may be received from the network from the start of the rescue 106 to the time the MS receives the forward link 132. The MS's mean rescue transmission output power 112 can also be continuously adapted based on changing interference ratios, changing receive power, or using dynamically calculated delta power levels 114 (recalculated during the rescue). In addition, the MS's mean rescue transmission output power 112 may change because the MS's updated active set and/or pilot signal strengths may change, causing changes to the MS's mean receive input power level 116 and the previously described rescue interference delta. Furthermore, as a rescue progresses and the delay during rescue increases, the previously described rescue delay compensation value will change.

In addition, one or more of the previously described four parameters that can contribute to the MS's mean rescue transmission output power 112 may be added to or deleted from the computation of the delta power level 114 as the rescue progresses. For example, although the rescue delay compensation value may not initially be part of the computation of the delta power level 114, if the time 128 starting from the MS's last reliable receipt of power control bits reaches a threshold and the rescue has not yet been completed, the MS's processor may add the rescue delay compensation value to its computation of the delta power level 114.

In another embodiment, power control steps can be applied using the MS's mean rescue transmission output power 112 as a starting point. In other words, MS transmissions during rescue can be stepped up in power, much like access channel probes, using pre-determined step sizes.

Although the power control enhancement concepts described hereinabove used a cellular network as an example, the basic concept of MS power control enhancement during rescue are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, a wireless terminal device, a Telematics modem, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a network and at least one mobile station (MS) for enabling communications with the at least one MS, the at least one MS having a connection with the network that is capable of becoming a potentially failing connection and the system for executing a rescue procedure for rescuing the potentially failing connection upon detection of the potentially failing connection, a method for computing a mean rescue transmission output power level of a MS having a potentially failing connection, the method comprising:

determining a mean rescue receive power level for the MS when the MS begins transmitting during the rescue procedure; and computing the MS's mean rescue transmission output power level by adding a delta power level to a negative of the mean rescue receive power level, the delta power level inherently including an offset representing open-loop power control;

wherein the delta power level includes a pre-rescue power delta computed by subtracting the MS's mean receive power level from the MS's transmit power level, the MS mean receive power level and the MS transmit power level measured at a time power control bits were received by the MS prior to detection of the potentially failing connection, the pre-rescue power delta including the offset.

2. The method as recited in claim 1, wherein the MS's mean rescue transmission output power level is recomputed during execution of the rescue procedure as the MS's mean rescue receive power level changes.

3. The method as recited in claim 1, further including multiplying the offset by a coefficient whose value is dependent on and directly proportional to a delay time, the delay time representing a time interval beginning at the time power control bits were received by the MS prior to the detection of the potentially failing connection, and ending at the start of the rescue procedure.

4. The method as recited in claim 3, wherein the coefficient is communicated to the MS in a message prior to the start of the rescue procedure.

5. In a system comprising a network and at least one mobile station (MS) for enabling communications with the at least one MS, the at least one MS having a connection with the network that is capable of becoming a potentially failing connection and the system for executing a rescue procedure for rescuing the potentially failing connection upon detection of the potentially failing connection, a method for computing a mean rescue transmission output power level of a MS having a potentially failing connection, the method comprising:

determining a mean rescue receive power level for the MS when the MS begins transmitting during the rescue procedure; and computing the MS's mean rescue transmission output power level by adding a delta power level to a negative of the mean rescue receive power level, the delta power level inherently including an offset representing open-loop power control;

wherein at least one MS is capable of maintaining a normal active set of pilots $A_N$ during normal operation and an updated rescue active set of pilots $A_R$ during the rescue procedure, the normal active set of pilots $A_N$ creating a combined normal pilot strength value $PS_N$ and the updated rescue active set of pilots $A_R$ creating a combined rescue pilot strength value $PS_R$, the method further including:

including a rescue interference delta in the delta power level, the rescue interference delta determined by computing a normal active set first interference correction term $IC_N = \min(\max(OFFSET-PS_N, LO\_IC), HI\_IC)$ and an updated rescue active set second interference correction term $IC_R = \min(\max(OFFSET-PS_R, LO\_IC),$ HI_IC), where OFFSET is a highest value in a selected range of $PS_N$ and $PS_R$ values, LO_IC is a lowest value in a selected range of $IC_N$ and $IC_R$ values, and HI_IC is a highest value in the selected range of $IC_N$ and $IC_R$ values, and computing the rescue interference delta as $IC_R-IC_N$.

6. The method as recited in claim 5, wherein the OFFSET, LO_IC, or HI_IC value is communicated to the MS in a message prior to a start of the rescue procedure.

7. The method as recited in claim 5, wherein the rescue interference delta and the delta power level are recomputed during execution of the rescue procedure as the updated rescue active set of pilots $A_R$ or the combined rescue pilot strength value $PS_R$ changes.

8. The method as recited in claim 1, wherein the delta power level includes a rescue delay compensation value that is multiplied by a coefficient that increases as a delay time increases, the delay time representing a time interval beginning at the time power control bits were received by the MS prior to detection of the potentially failing connection, and ending at an end of the rescue procedure.

9. The method as recited in claim 8, wherein the rescue delay compensation value is recomputed at fixed time intervals during execution of the rescue procedure.

10. The method as recited in claim 8, wherein the rescue delay compensation value or the coefficient is communicated to the MS in a message prior to a start of the rescue procedure.

11. The method as recited in claim 1, wherein the delta power level includes a pre-determined value selected to balance a time needed to complete the rescue procedure and the MS's mean rescue transmission output power level.

12. The method as recited in claim 11, wherein the pre-determined value is communicated to the MS in a message prior to a start of the rescue procedure.

13. The method as recited in claim 11, wherein the pre-determined value includes the offset.

14. In a system comprising a network and at least one mobile station (MS) for enabling communications with the at least one MS, the at least one MS having a connection with the network that is capable of becoming a potentially failing connection and the system for executing a rescue procedure for rescuing the potentially failing connection upon detection of the potentially failing connection, a method for computing a mean rescue transmission output power level of a MS having a potentially failing connection, the MS capable of maintaining a normal active set of pilots $A_N$ during normal operation and an updated rescue active set of pilots $A_R$ during the rescue procedure, the normal active set of pilots $A_N$ creating a combined normal pilot strength value $PS_N$ and the updated rescue active set of pilots $A_R$ creating a combined rescue pilot strength value $PS_R$, the method comprising:

determining a mean rescue receive power level for the MS when the MS begins transmitting during the rescue procedure; and computing the MS's mean rescue transmission output power level by adding a delta power level to a negative of the mean rescue receive power level, the delta power level inherently including an offset representing open-loop power control;

wherein the delta power level includes contributions from one or more of four parameters, the four parameters comprising a pre-rescue power delta computed by subtracting the MS's mean receive power level from the MS's transmit power level, the MS mean receive power level and the MS transmit power level measured at a time power control bits were received by the MS prior to detection of the potentially failing connection, the pre-rescue power delta including the offset, a rescue interference delta computed by determining a normal active set first interference correction term $IC_N=\min(\max(OFFSET-PS_N,LO\_IC),HI\_IC)$ and an updated rescue active set second interference correction term $IC_R=\min(\max(OFFSET-PS_R, LO\_IC),HI\_IC)$, where OFFSET is a highest value in a selected range of $PS_N$ and $PS_R$ values, LO_IC is a lowest value in a selected range of $IC_N$ and $IC_R$ values, and HI_IC is a highest value in the selected range of $IC_N$ and $IC_R$ values, and computing the rescue interference delta as $IC_R-IC_N$, a rescue delay compensation value that is multiplied by a coefficient that increases as a delay time increases, the delay time representing a time interval beginning at the time power control bits were received by the MS prior to detection of the potentially failing connection, and ending at an end of the rescue procedure, and a pre-determined value selected to balance a time needed to complete the rescue procedure and the MS's mean rescue transmission output power level.

15. The method as recited in claim 14, wherein one or more of the four parameters are recomputed during execution of the rescue procedure.

16. The method as recited in claim 14, wherein one or more of the four parameters not previously contributing to the delta power level are subsequently included in the delta power level during execution of the rescue procedure.

17. The method as recited in claim 14, wherein one or more of the four parameters previously contributing to the delta power level are subsequently removed from the delta power level computation during execution of the rescue procedure.

18. In a system comprising a network and at least one mobile station (MS) for enabling communications with the at least one MS, the at least one MS having a connection with the network that is capable of becoming a potentially failing connection and the system for executing a rescue procedure for rescuing the potentially failing connection upon detection of the potentially failing connection, a method for computing a mean rescue transmission output power level of a MS having a potentially failing connection, the method comprising:

a step for determining a mean rescue receive power level for the MS when the MS begins transmitting during the rescue procedure; and a step for computing the MS's mean rescue transmission output power level by adding a delta power level to a negative of the mean rescue receive power level, the delta power level inherently including an offset representing open-loop power control;

wherein the delta power level includes a pre-rescue power delta computed by subtracting the MS's mean receive power level from the MS's transmit power level, the MS mean receive power level and the MS transmit power level measured at a time power control bits were received by the MS prior to detection of the potentially failing connection, the pre-rescue power delta including the offset.

19. A mobile station (MS) for communicating with a network and for assisting in rescuing the MS when the MS has a connection with the network that has become a potentially failing connection by executing a rescue procedure and transmitting on a reverse link at a specified mean rescue transmission output power level, the MS comprising:

a MS processor programmed for
determining a mean rescue receive power level for the MS when the MS begins transmitting during the rescue procedure,
computing the mean rescue transmission output power level for the MS by adding a delta power level to a negative of the mean rescue receive power level, the delta power level inherently including an offset representing open-loop power control, and
computing and including a pre-rescue power delta in the delta power level, the pre-rescue power delta computed by subtracting the MS's mean receive power level from the MS's transmit power level, the MS mean receive power level and the MS transmit power level measured at a time power control bits were received by the MS prior to detection of the potentially failing connection, the pre-rescue power delta including the offset.

20. The MS as recited in claim 19, the MS processor further programmed for recomputing the MS's mean rescue transmission output power level during execution of the rescue procedure as the MS's mean rescue receive power level changes.

21. The MS as recited in claim 19, the MS processor further programmed for multiplying the offset by a coefficient whose value is dependent on and directly proportional to a delay time, the delay time representing a time interval beginning at the time power control bits were received by the MS prior to the detection of the potentially failing connection, and ending at the start of the rescue procedure.

22. The MS as recited in claim 21, the MS processor further programmed for receiving the coefficient in a message prior to the start of the rescue procedure.

23. A mobile station (MS) for communicating with a network and for assisting in rescuing the MS when the MS has a connection with the network that has become a potentially failing connection by executing a rescue procedure and transmitting on a reverse link at a specified mean rescue transmission output power level, the MS comprising:

a MS processor programmed for
determining a mean rescue receive power level for the MS when the MS begins transmitting during the rescue procedure,
computing the mean rescue transmission output power level for the MS by adding a delta power level to a negative of the mean rescue receive power level, the delta power level inherently including an offset representing open-loop power control,
maintaining a normal active set of pilots $A_N$ and measuring a combined normal pilot strength value $PS_N$ from $A_N$ during normal operation, and maintaining an updated rescue active set of pilots $A_R$ and measuring a combined rescue pilot strength value $PS_R$ from $A_R$ during execution of the rescue procedure, and
including a rescue interference delta in the delta power level, the rescue interference delta determined by computing a normal active set first interference correction term $IC_N$=min(max(OFFSET−$PS_N$,LO_IC), HI_IC) and an updated rescue active set second interference correction term $IC_R$=min(max (OFFSET−$PS_R$,LO_IC),HI_IC), where OFFSET is a highest value in a selected range of $PS_N$ and $PS_R$ values, LO_IC is a lowest value in a selected range of $IC_N$ and $IC_R$ values, and HI_IC is a highest value in the selected range of $IC_N$ and $IC_R$ values, and computing the rescue interference delta as $IC_R$−$IC_N$.

24. The MS as recited in claim 23, the MS processor further programmed for receiving the OFFSET, LO_IC or HI_IC value in a message prior to a start of the rescue procedure.

25. The MS as recited in claim 23, the MS processor further programmed for recomputing the rescue interference delta and the delta power level during execution of the rescue procedure as the updated rescue active set of pilots $A_R$ or the combined rescue pilot strength value $PS_R$ changes.

26. The MS as recited in claim 19, the MS processor further programmed for including a rescue delay compensation value in the delta power level, the rescue delay compensation value multiplied by a coefficient that increases as a delay time increases, the delay time representing a time interval beginning at the time power control bits were received by the MS prior to detection of the potentially failing connection, and ending at an end of the rescue procedure.

27. The MS as recited in claim 26, the MS processor further programmed for recomputing the rescue delay compensation value at fixed time intervals during execution of the rescue procedure.

28. The MS as recited in claim 26, the MS processor further programmed for receiving the rescue delay compensation value or the coefficient in a message prior to a start of the rescue procedure.

29. The MS as recited in claim 19, the MS processor further programmed for including a pre-determined value in the delta power level, the pre-determined value selected to balance a time needed to complete the rescue procedure and the MS's mean rescue transmission output power level.

30. The MS as recited in claim 29, the MS processor further programmed for receiving the pre-determined value in a message prior to a start of the rescue procedure.

31. The MS as recited in claim 29, wherein the pre-determined value includes the offset.

32. A mobile station (MS) for communicating with a network and for assisting in rescuing the MS when the MS has a connection with the network that has become a potentially failing connection by executing a rescue procedure and transmitting on a reverse link at a specified mean rescue transmission output power level, the MS comprising:

a MS processor programmed for
determining a mean rescue receive power level for the MS when the MS begins transmitting during the rescue procedure, and
computing the MS's mean rescue transmission output power level by adding a delta power level to a negative of the mean rescue receive power level, the delta power level inherently including an offset representing open-loop power control;
wherein the MS processor is further programmed for including in the delta power level contributions from one or more of four parameters, the four parameters comprising
a pre-rescue power delta computed by subtracting the MS's mean receive power level from the MS's transmit power level, the MS mean receive power level and the MS transmit power level measured at a time power control bits were received by the MS prior to detection of the potentially failing connection, the pre-rescue power delta including the offset,
a rescue interference delta computed by maintaining a normal active set of pilots $A_N$ and measuring a combined normal pilot strength value $PS_N$ from $A_N$ during normal operation, maintaining an updated rescue active set of pilots $A_R$ and measuring a combined rescue pilot strength value $PS_R$ from $A_R$ during execution of the rescue procedure, determining a normal active set first interference correction term $IC_N$=min(max(OFFSET−$PS_N$,LO_IC),HI_IC) and an updated rescue active set second interference correction term $IC_R$=min(max(OFFSET−$PS_R$, LO_IC),HI_IC), where OFFSET is a highest value in a selected range of $PS_N$ and $PS_R$ values, LO_IC is a lowest value in a selected range of $IC_N$ and $IC_R$ values, and HI_IC is a highest value in the selected range of $IC_N$ and $IC_R$ values, and computing the rescue interference delta as $IC_R$−$IC_N$, a rescue delay compensation value that is multiplied by a coefficient that increases as a delay time increases, the delay time representing a time interval beginning at the time power control bits were received by the MS prior to detection of the potentially failing connection, and ending at an end of the rescue procedure, and a pre-determined value selected to balance a time needed to complete the rescue procedure and the MS's mean rescue transmission output power level.

33. The MS as recited in claim 32, the MS processor further programmed for recomputing one or more of the four parameters during execution of the rescue procedure.

34. The MS as recited in claim 32, the MS processor further programmed for including one or more of the four parameters not previously contributing to the delta power level in the delta power level computation during execution of the rescue procedure.

35. The MS as recited in claim 32, the MS processor further programmed for removing one or more of the four parameters previously contributing to the delta power level from the delta power level computation during execution of the rescue procedure.

36. A mobile station (MS) for communicating with a network and for assisting in rescuing the MS when the MS has a connection with the network that has become a potentially failing connection by executing a rescue procedure and transmitting on a reverse link at a specified mean rescue transmission output power level, the MS comprising:

means for determining a mean rescue receive power level for the MS when the MS begins transmitting during the rescue procedure;

means for computing the MS's mean rescue transmission output power level by adding a delta power level to a negative of the mean rescue receive power level, the delta power level inherently including an offset representing open-loop power control; and means for computing and including a pre-rescue power delta in the delta power level, the pre-rescue power delta computed by subtracting the MS's mean receive power level from the MS's transmit power level, the MS mean receive power level and the MS transmit power level measured at a time power control bits were received by the MS prior to detection of the potentially failing connection, the pre-rescue power delta including the offset.

* * * * *